Patented Nov. 1, 1932

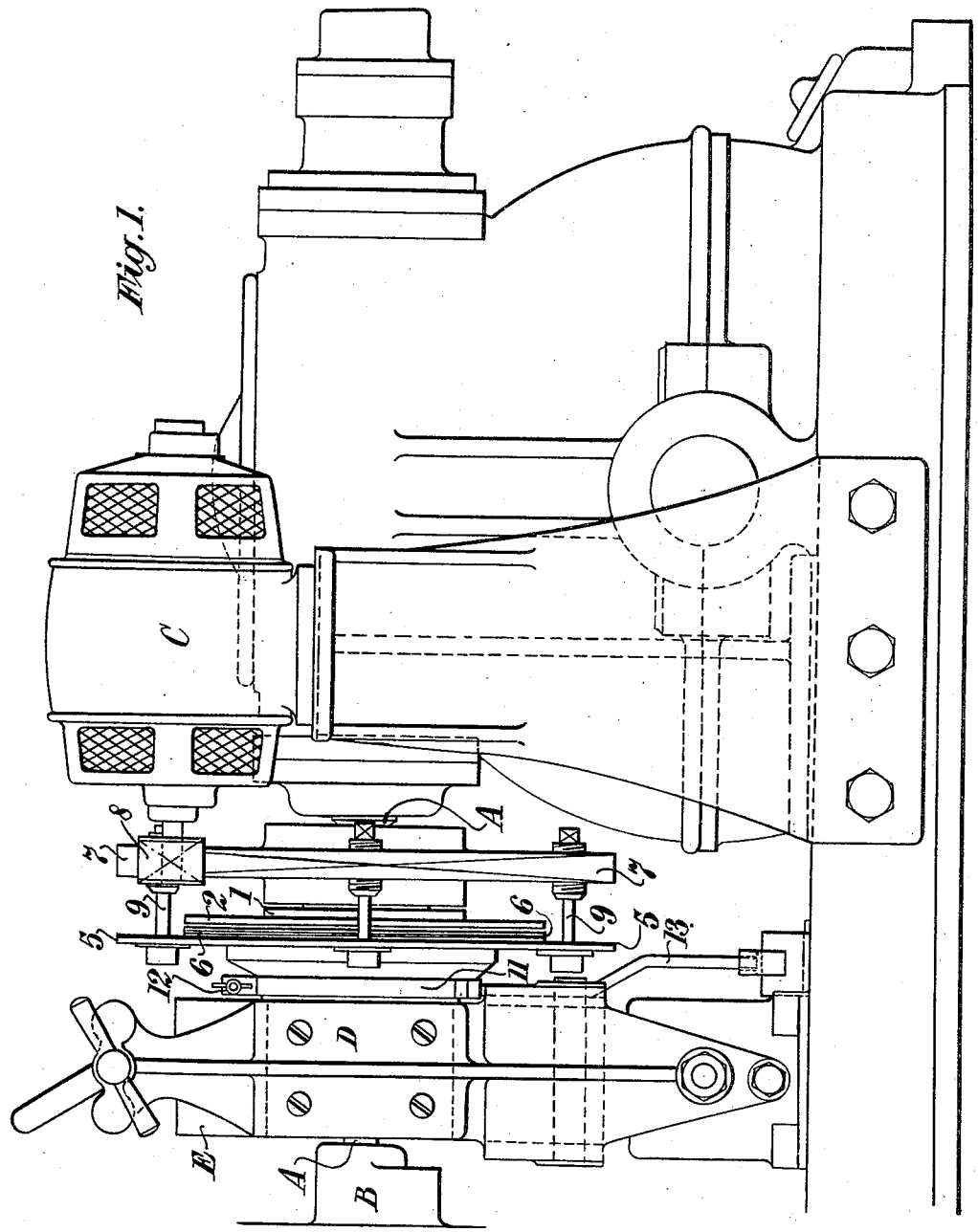

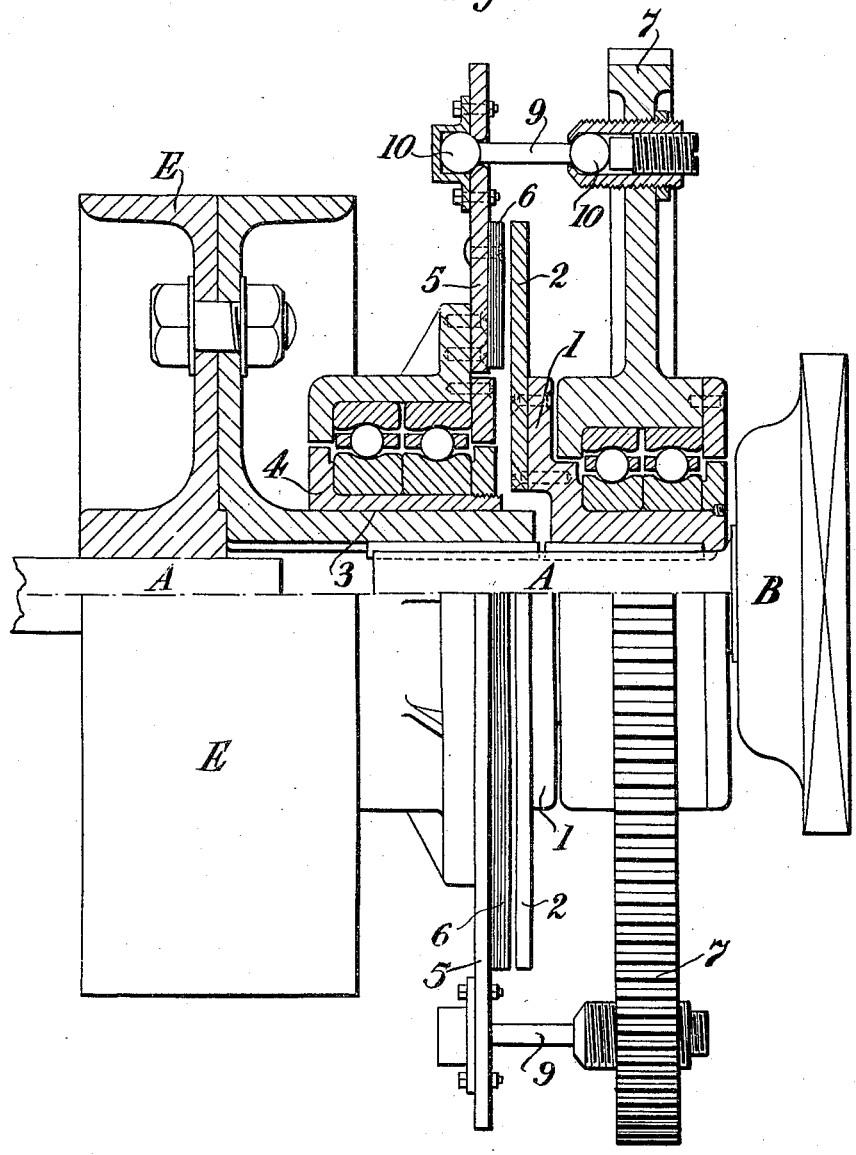

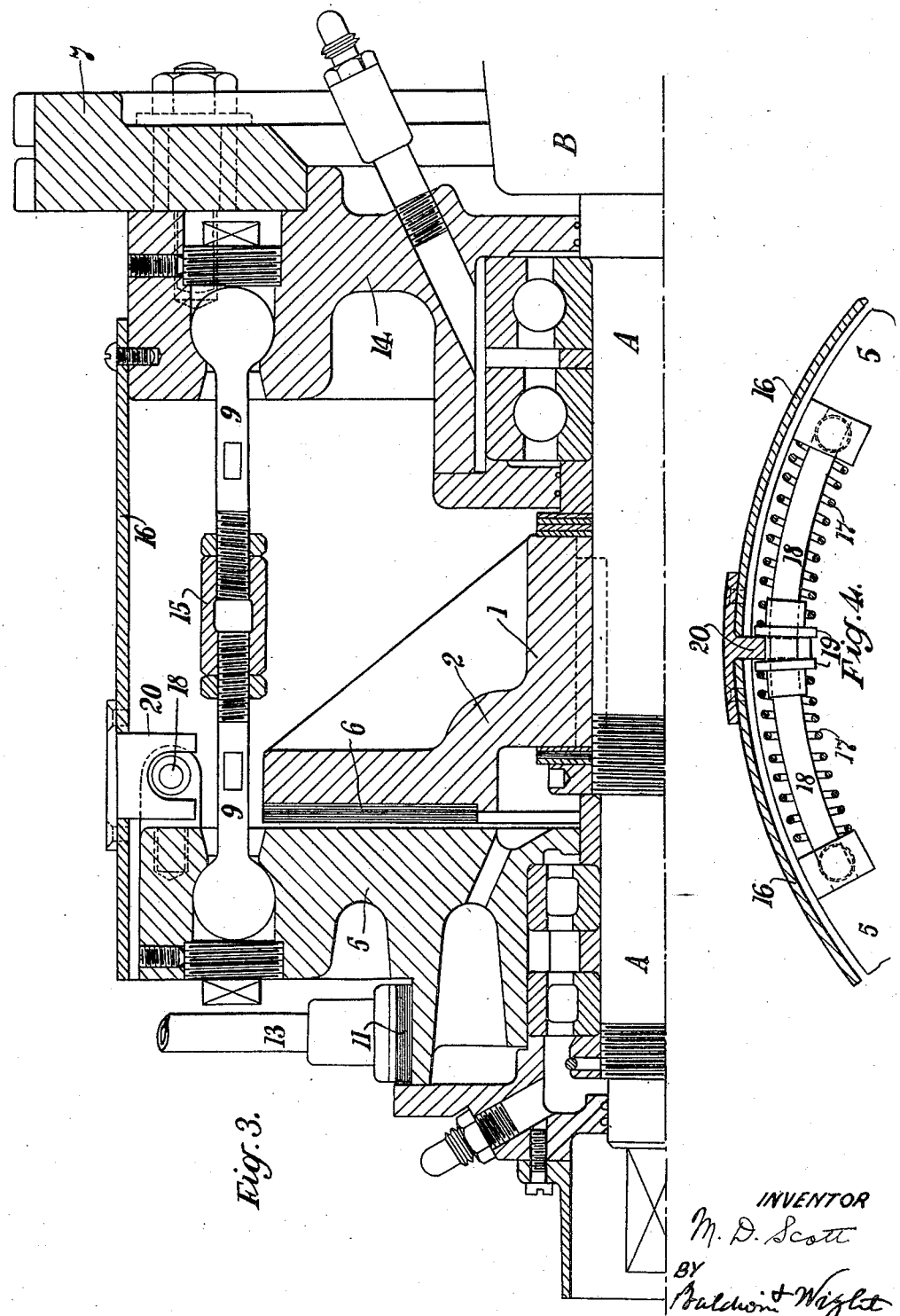

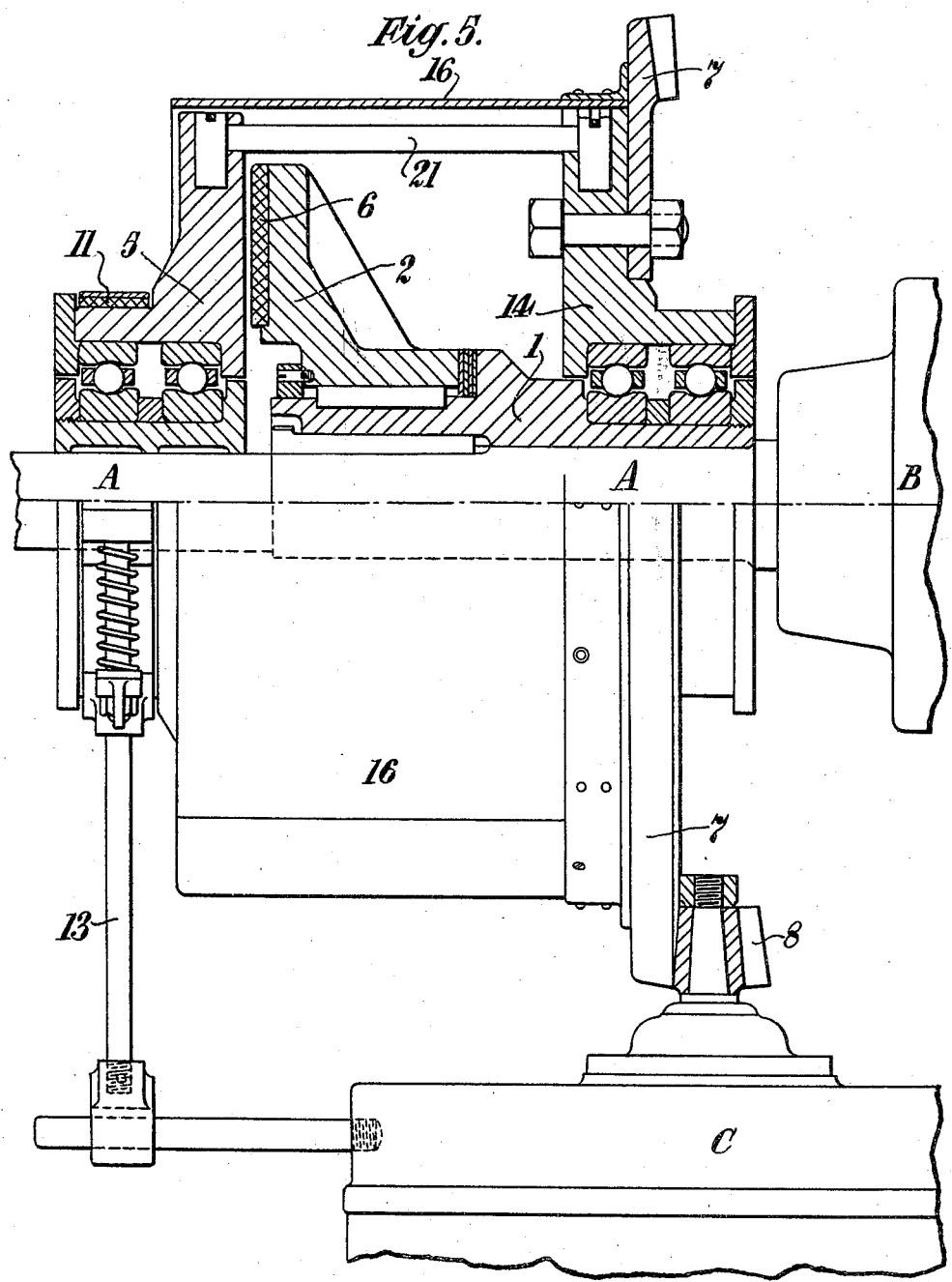

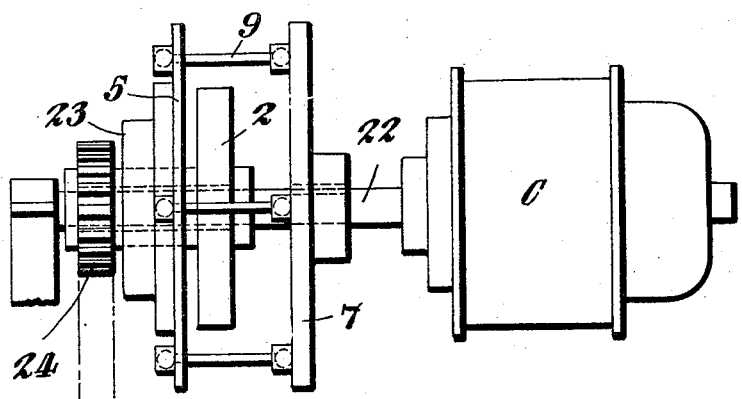
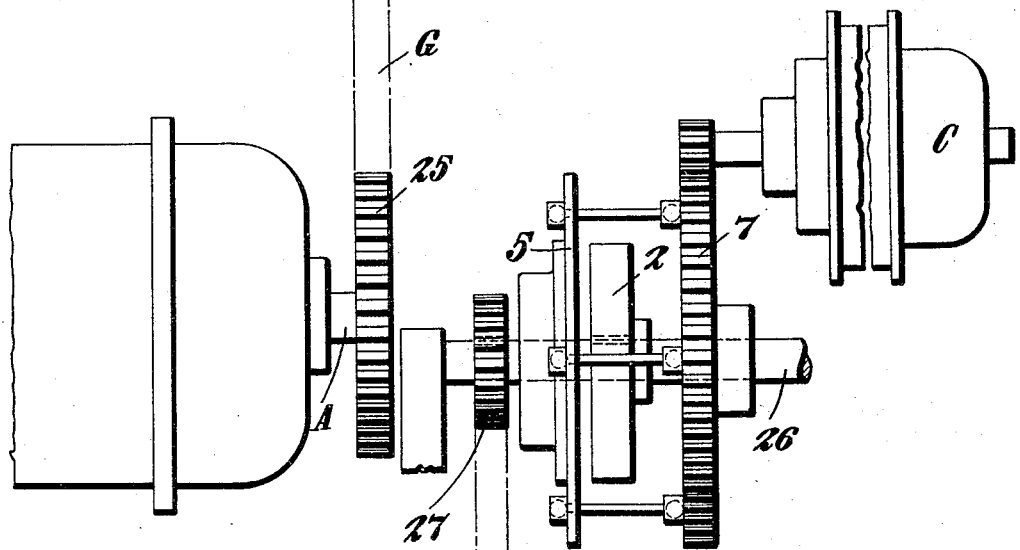
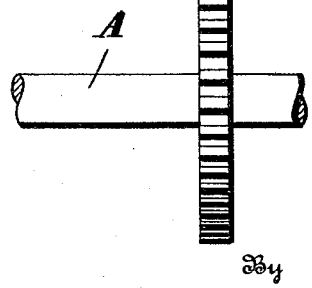

1,885,771

UNITED STATES PATENT OFFICE

MURRAY DUNCAN SCOTT, OF LONDON, ENGLAND

FREE WHEEL CLUTCH MECHANISM FOR USE IN HOISTING AND LOAD-CARRYING MACHINES

Application filed July 13, 1929, Serial No. 378,107, and in Great Britain December 4, 1928.

This invention relates to improvements in load carrying machines having a main and auxiliary motive mechanism, the auxiliary mechanism being employed for running the machine at a slow speed such as for starting and stopping.

The invention has been found especially suitable for use with electrically controlled lifts of the type employing a main and an auxiliary motor in which the drive is automatically transferred from the main to an auxiliary or slow speed motor as the lift approaches the predetermined stopping place, the main motor circuit having previously been broken and with reference to which it is hereinafter described. In such lifts and other mechanisms having drives at two speeds difficulties have been experienced in the transfer from the low to the higher speed and vice versa. Overrunning clutches have before been suggested in which the sliding part of the clutch is operatively controlled by links connecting it to a member fast on the driving shaft, the links due to the inertia or lag of the sliding clutch part, which is freely mounted on the driving shaft taking up an oblique position and thus causing a movement of the sliding clutch part and engagement of the clutch.

One of the objects of the invention is the adaptation of the form of over-running clutch mechanism above described to load-carrying machines, and more particularly to lifts with reference to which the invention is hereinafter described and illustrated and by means of which free wheel movement for both forward and reverse running can be obtained.

According to the present invention the drive from the auxiliary motor or motive mechanism to the transmission or main driving shaft through which the drive is normally transmitted from the main motor to the load comprises a pinion or other member in constant driving connection with the auxiliary motor or motive mechanism, which member is mounted on the transmission or auxiliary shaft (or a lay shaft coupled to said transmission shaft) and link for transmitting drive from the pinion or other member to and for causing actuation of the movable part of a clutch whose other part is secured or coupled to the transmission or auxiliary shaft (or the lay shaft).

In operation, rotation of the pinion causes sliding movement of the moving part of the clutch into driving engagement with the stationary part of the clutch owing to the variation in the angle of set of the links which is due to the lag of the moving part of the clutch.

A drag brake or other means is provided to give the necessary lag or inertia to the moving part of the clutch, and in order to insure clutch disengagement when it is desired to obtain free wheel movement for forward and reverse running, spring means are provided for holding the moving part out of contact with the stationary part of the clutch.

The invention is illustrated in the accompanying drawings as applied to hoisting mechanism suitable for operating a lift. Figure 1 is a general elevation and Figure 2 a sectional elevation showing the clutch mechanism on a larger scale.

Figures 3 and 4 are sectional elevations of a modified form of the clutch showing details.

Figure 5 is a sectional elevation of an alternative form of clutch.

Figure 6 is a diagrammatic view of another modified form, and

Figure 7 is a diagrammatic view of a further modified form.

In the drawings A indicates the main driving shaft to which is coupled the main motor B through suitable gearing (not shown) for normal speed drive. C is an auxiliary motor for driving at slow speeds. D is a brake on the brake drum E fast on the main shaft A.

It will be understood that the main motor B is in permanent driving connection with shaft A.

Referring now more particularly to Figures 1–4 of the drawings, there is keyed upon the shaft A a member 1 having a clutch face plate 2 and forming the fixed part of the clutch. Slidably mounted upon the surface 3 of the hub of the brake drum E and thus the main shaft is a sleeve piece 4 carrying bearing rings for rotatably mounting a plate 5 having a clutch disc 6 and forming the moving portion of the clutch.

Rotatably mounted on bearing rings carried by member 1, is a pinion 7 in mesh with a pinion 8 (not shown in Figure 2) fast on the shaft of the auxiliary motor C.

It will be seen that the moving portion or clutch plate 5 is slidably and rotatably mounted with respect to shaft A, while the fixed portion of the clutch plate 2 is fast on the driving shaft A, the pinion 7 being normally free to rotate with respect to shaft A.

Between the pinion 7 and moving clutch plate 5 are flexible connections which as shown Figures 1 and 2 consist of links 9 having universal joint connections 10 at each end.

Drive from the auxiliary motor C can thus be transmitted through pinions 8—7, link connections 9, and clutch plates 5—2 to the main shaft A. 11 is a drag brake band mounted on the hub of the clutch plate 5 and provided with a tension adjusting screw 12.

Said drag brake band 11 is held against rotation by a leg 13 slidably attached to a part of the frame and by means of the screw 12 its braking action can be adjusted to impart a lag to the plate 5. This drag brake 11 has a constant frictional engagement with the movable clutch member 5.

Referring now to Figures 3, 4, and 5 the pinion 7 is bolted to a hub 14 rotatably mounted on the shaft A. In Figure 3 the links 9 are formed in two pieces whose ends are screw threaded right and left hand and joined by a socket piece 15 correspondingly screw threaded and by means of which the angle of lag of the links can be varied.

Mounted on the hub 14 is a protecting housing 16 to exclude dust and which overlaps the sliding clutch plate 5.

In order to provide for wear of the clutch plates, the fixed portion of the clutch may be separately mounted on the main shaft A and its position adjustable longitudinally thereon by means of shims and a sliding feather.

In order to ensure disengagement of the clutch, self centering springs 17 are mounted over rods 18 carried by the sliding portion of the clutch. These springs overcome the frictional engagement of the brake 11 with the movable clutch member 5 in returning the latter to its neutral position. The springs need only be sufficiently strong to move the pinion 7 or equivalent part together with the shaft of the auxiliary motor in the reverse direction when the machine is at a standstill. The springs 17 press against collars 19 which bear on each side of a lug 20 fixed to the shield casing 16. The reaction between these springs 17, and the shield casing 16 tends to return the pinion 7 and the sliding clutch plate 5 to a uniform central position. The links 9 then in compression, will cause the clutch plate 5 to move away from the fixed clutch plate 2 thus disengaging the clutch. In Figure 5 in place of the connecting links 9 the pinion 7 and clutch plate 5 are connected to one another by flat spring steel links 21 which function in the same manner as the self centering springs 17 to ensure disengagement of the clutch.

In the diagram of Figure 6, the construction differs from the other forms in that the clutch mechanism is mounted on an auxiliary motor shaft indicated at 22, the driving pinion or member 7 being fast thereon and connected by the links 9 to the moving clutch plate 5, which is slidable upon a sleeve 23 freely mounted on shaft 22.

On one end of the sleeve 23, the stationary clutch plate 2 is formed, and the other end carries a pinion 24 coupled through suitable gearing G to a pinion 25 on the main motor shaft A.

Referring to Figure 7, it is modified with respect to the other forms in that 26 is a lay or counter shaft upon which the clutch mechanism is mounted. A pinion 27 is mounted on the shaft 26 and is in driving connection with the main motor shaft A.

Operation of the clutch mechanism takes place as follows: assuming that the parts are stationary, rotation of the pinion 7 will cause the moving clutch plate 5 to slide along the shaft A into driving engagement with the fixed clutch plate 2 owing to the variation in the angle of set of the connecting members 9 or 21 due to the lag of the moving clutch plate 5 which is brought about by the drag brake 11. It will be clear that if now the circuit of the main motor B is completed to drive the main shaft A, as soon as the motor B gathers speed and its revolutions are equal to or exceed those of the pinion 7 and clutch plate 5, the plate 5 will disengage from the fixed portion 2 of the clutch since there is no longer any lag of plate 5 with respect to the pinion 7. Disengagement is ensured by means of the thrust of the links 9 and the self centering springs 17 or by the spring links 21 when provided, but it is sufficient in order to cause disengagement to provide a spring (not shown) between the clutch plates 5 and 2 and which tends normally to separate and hold them out of driving engagement.

The self-centering springs are fitted so as to cause the clutch plate 5 and the pinion 7 to take up a position where the links 9 are not inclined to the plate 5. Normally the thrust of the links 9 is sufficient to separate the clutch plates but where a forward and reverse drive is required as in the case of a lift, it is necessary to provide self-centering springs or a spring which functions to separate the clutch plates. With a one way drive this is not necessary since the direction of rotation is always the same, and it is immaterial whether the clutch returns to its fully disengaged position.

It will be seen that once the clutch is disengaged a free wheel movement of the clutch plate 5, pinion 7 and associated parts is obtained and the auxiliary motor circuit can now be broken. Clearly the reverse operation applies, and if the main motor circuit is broken and that of the auxiliary motor energized, the auxiliary motor will take up the drive through the clutch plate 5 as soon as the speed of rotation of the main shaft A has fallen to that of the auxiliary motor.

It will be appreciated that by means of the present invention free wheel movement is obtained for both forward and reverse drive, furthermore by the provision of the self centering or other springs the clutch must automatically release itself owing to the fact that there is a back thrust by the spring against the clutch plate 5 which is held by the dragbrake, so that the thrust will tend to straighten the connecting links which will thus push back the plate 5, releasing the clutch.

Suitable automatic zone operating contacts are provided to bring the auxiliary motor into operation preferably before the lift car and transmission shaft has stopped, that is when it has fallen or has been caused to fall by brake D or other means (such as by increasing the field strength or reducing the armature potential of the main motor) to a speed at which the auxiliary motor may take up the drive.

Drive from the main motor takes place in the normal manner, the motor being slowed down and stopped automatically by normal control equipment at or near the level of the floor. In the event of the registration not being exact, the automatic control equipment operates and causes the auxiliary motor to rotate in the direction required to raise or lower the load, as may be necessary. Rotation of the auxiliary motor will correspondingly rotate the pinion wheel coupled to the auxiliary motor and this will cause a sliding movement of the moving clutch plate bringing it into driving engagement with the fixed clutch disc owing to the variation in the angle or set of the flexible connections and due to the lag of the clutch disc. Contact between these two surfaces will cause rotation of the transmission shaft, the lift cage or load will be raised or lowered slowly to the exact floor registration when automatic control equipment will break the circuit of the auxiliary motor, the movable clutch plate moving into free wheel position.

The clutching mechanism may be mounted either between the main motor and the usual worm gear or transmission shaft, or at an extension of the transmission shaft.

Although the invention has been described with reference only to a lift it is applicable for starting Diesel motors and for example winding up clocks or balance weights in lighthouses where it is undesirable to let the winding crank or member revolve after winding is accomplished.

What I claim is:—

1. In combination, a transmission shaft member adapted for driving at normal running speed, a driving member adapted for slow speed running, clutch mechanism having a stationary part coupled to one of said members, a movable clutch part, links for transmitting drive from the driving member to and for causing actuation of said movable part, and means for causing lag of the movable clutch part.

2. The combination of claim 1 wherein each of said driving member 1, stationary and movable parts is mounted on the transmission shaft.

3. The combination of claim 1 having spring means for normally holding the stationary and movable parts out of engagement.

4. The combination of claim 1 having self-centering springs for normally holding the stationary and movable parts out of engagement.

5. The combination of claim 1 wherein said links are of spring material.

6. The combination of claim 1 wherein said driving member has a shaft and said clutch mechanism is located about said latter shaft.

7. In combination, a transmission shaft member adapted for driving at normal running speed, a driving member adapted for slow speed running, clutch mechanism having a stationary part coupled to one of said members, a movable clutch part, a dust housing extending from one of said parts, a lug on said housing, a rod positioned by said lug, links for transmitting drive from the driving member to and for causing actuation of said movable part, means for causing lag of the movable clutch part, and spring means coacting with the rod and movable member to normally hold the clutch members out of engagement.

8. In combination, a transmission shaft member adapted for driving at normal running speed, a driving member adapted for slow speed running, clutch mechanism having a stationary part coupled to one of said members, a movable clutch part, links for transmitting drive from the driving member to and for causing actuation of said movable part, means for causing lag of the movable clutch part, a housing extending from one of the members over the space between the members, and means engaging the housing and movable member urging separation of the clutch members.

9. In combination, a transmission shaft member adapted for driving at normal running speed, a driving member adapted for slow speed running, clutch mechanism having a stationary part coupled to one of said members, a movable clutch part, links for transmitting drive from the driving member to and for causing actuation of said movable part, means for causing lag of the movable clutch part, a housing extending from one of the elements over the space between the elements, a lug on said housing, a rod positioned by said lug, and springs surrounding said rod, abutting portions thereof and said lug so as to urge separation of the clutch members.

10. In combination, a transmission shaft member, a driving member adapted to be rotated at a different speed from the transmission shaft member and journaled for rotation about the axis of said transmission shaft member, a clutch member fixed on said transmission shaft member, a clutch member rotatable about the shaft member and slidable axially of the latter, the first clutch member being located between the driving member and second clutch member, mechanism operable automatically through operation of the driving member for transmitting drive from the driving member to and for causing actuation of said movable clutch member, and continuously applied means for causing lag of the movable clutch member.

11. In combination, a transmission shaft member, a driving member adapted to be rotated at a different speed from the transmission shaft member, a clutch member fixed on said transmission shaft member, a rotatable and laterally movable clutch member, and mechanism operable automatically through operation of the driving member for transmitting drive from the driving member to and for causing actuation of the second mentioned clutch member, and continuously applied means for causing lag of the movable clutch member.

12. In combination, a transmission shaft member, a driving member adapted to be rotated at a different speed from the transmission shaft member, a clutch member fixed on said transmission shaft member, a clutch member rotatably and slidably mounted, the first clutch member being located between the driving member and second clutch member, link mechanism operable automatically through operation of the driving member for transmitting drive from the driving member to and for causing actuation of the second mentioned clutch member, and continuously applied means for causing lag of the second mentioned clutch member.

13. The combination according to claim 12 wherein the driving member is a pinion and said mechanism is located inwardly of the periphery of the pinion.

14. In combination, a transmission shaft member, a driving member adapted to be rotated at a different speed from the transmission shaft member, and journaled for rotation about the axis of said transmission shaft member, a clutch member fixed on said transmission shaft member, a clutch member rotatable about the shaft member and slidable axially of the latter, mechanism urging the second mentioned clutch member to a neutral position and operable automatically through operation of the driving member for transmitting drive from the driving member to and for causing actuation of said movable clutch member, and continuously applied braking means for causing lag of the second mentioned clutch member.

In testimony that I claim the foregoing as my invention I have signed my name this 3rd day of July, 1929.

MURRAY DUNCAN SCOTT.